(12) United States Patent
Quinlan et al.

(10) Patent No.: US 10,838,761 B2
(45) Date of Patent: Nov. 17, 2020

(54) SHARED LOCK STATE

(71) Applicant: GOOD TECHNOLOGY HOLDINGS LIMITED, Waterloo (CA)

(72) Inventors: Sean Michael Quinlan, Duvall, WA (US); Haniff Somani, Mercer Island, WA (US); Sanjiv Maurya, Fremont, CA (US)

(73) Assignee: BlackBerry Limited, Waterloo (CA)

( * ) Notice: Subject to any disclaimer, the term of this patent is extended or adjusted under 35 U.S.C. 154(b) by 94 days.

(21) Appl. No.: 15/508,985

(22) PCT Filed: Sep. 4, 2015

(86) PCT No.: PCT/US2015/048685
§ 371 (c)(1),
(2) Date: Mar. 6, 2017

(87) PCT Pub. No.: WO2016/040186
PCT Pub. Date: Mar. 17, 2016

(65) Prior Publication Data
US 2017/0269963 A1   Sep. 21, 2017

Related U.S. Application Data

(60) Provisional application No. 62/047,573, filed on Sep. 8, 2014.

(51) Int. Cl.
| | | |
|---|---|---|
| *G06F 9/48* | (2006.01) | |
| *G06F 9/54* | (2006.01) | |
| *H04L 9/32* | (2006.01) | |

(52) U.S. Cl.
CPC .............. *G06F 9/485* (2013.01); *G06F 9/542* (2013.01); *H04L 9/3247* (2013.01); *H04L 9/3263* (2013.01)

(58) Field of Classification Search
CPC ............................ H04L 9/3247; H04L 9/3263
See application file for complete search history.

(56) References Cited

U.S. PATENT DOCUMENTS

| | | | | |
|---|---|---|---|---|
| 2002/0078393 A1* | 6/2002 | Parker | ................... | G06F 1/1626 713/324 |
| 2002/0138735 A1* | 9/2002 | Felt | .................... | G06Q 20/3829 713/176 |

(Continued)

FOREIGN PATENT DOCUMENTS

WO    WO 2007/047846    4/2007

OTHER PUBLICATIONS

International Search Report and Written Opinion of the International Searching Authority issued in International Application No. PCT/US2015/048685 dated Dec. 4, 2015; 13 pages.

(Continued)

*Primary Examiner* — Tuan C Dao
(74) *Attorney, Agent, or Firm* — Fish & Richardson P.C.

(57) ABSTRACT

A method of managing a plurality of applications on a computing device. The method comprises receiving, by a first application running on the computing device, a lock message comprising a timestamp and a digital signature associated with the timestamp, from a second application miming on the computing device. Upon receipt of the lock message, the first application verifies the digital signature to confirm the authenticity of the timestamp. Once the timestamp has been confirmed by the first application, the first application locks the first application. Accordingly, a lock event with respect to an application in the plurality of applications can be propagated to other applications in the plurality of applications.

14 Claims, 7 Drawing Sheets

(56) References Cited

U.S. PATENT DOCUMENTS

| | | | | |
|---|---|---|---|---|
| 2003/0065941 | A1* | 4/2003 | Ballard | H04L 63/04 |
| | | | | 726/1 |
| 2003/0159029 | A1* | 8/2003 | Brown | G07B 17/00193 |
| | | | | 713/151 |
| 2005/0198170 | A1* | 9/2005 | LeMay | H04L 63/045 |
| | | | | 709/206 |
| 2005/0257072 | A1 | 11/2005 | Cross et al. | |
| 2006/0064582 | A1* | 3/2006 | Teal | G06F 21/105 |
| | | | | 713/156 |
| 2006/0248082 | A1* | 11/2006 | Raikar | H04L 9/32 |
| 2012/0192254 | A1* | 7/2012 | Garcia Perez | G06F 21/32 |
| | | | | 726/4 |
| 2012/0270496 | A1* | 10/2012 | Kuenzi | G07C 9/00309 |
| | | | | 455/41.1 |
| 2013/0227279 | A1 | 8/2013 | Quinlan et al. | |
| 2013/0227280 | A1 | 8/2013 | Quinlan et al. | |
| 2013/0227287 | A1 | 8/2013 | Quinlan et al. | |
| 2013/0279689 | A1* | 10/2013 | Obaidi | G06F 21/88 |
| | | | | 380/28 |
| 2014/0062466 | A1* | 3/2014 | Thibault | G01B 7/14 |
| | | | | 324/207.22 |
| 2015/0347209 | A1* | 12/2015 | Lyubinin | G06F 21/31 |
| | | | | 719/313 |

OTHER PUBLICATIONS

Oreans Technologies; "WinLicense and XBundler"; Dec. 31, 2010; 273 pages. Retrieved from the Internet: http://www.oreans.com/WinLicenseHelp.pdf.

Mammass, Hafid; "Implementation of Smart Card Personalization Software"; 2011 International Conference on Multimedia Computing and Systems (ICMCS); Apr. 7, 2011; pp. 1-7.

Durahim, A.O. et al.; "Transparent Code Authentication at the Processor Level"; IET Computers and Digital Techniques; vol. 3, No. 4; Jul. 1, 2009; pp. 354-372.

European Search Report and Written Opinion (Communication pursuant to Article 94(3)) in European Application No. 15778077.6, dated Feb. 21, 2018, 10 pages.

Summons to Attend Oral Proceedings pursuant to Rule 115(1) EPC issued in European Application No. 15778077.6 on May 14, 2019, 11 pages.

Summons to Attend Oral Proceedings pursuant to Rule 115(1) EPC issued in European Application No. 15778077.6 on Oct. 4, 2019, 6 pages.

* cited by examiner

US 10,838,761 B2

SHARED LOCK STATE

CROSS-REFERENCE TO RELATED APPLICATIONS

This application is a U.S. National Stage of PCT/US2015/048685 filed on Sep. 4, 2015, which claims the benefit of U.S. Provisional Application No. 62/047,573, filed Sep. 8, 2014, the contents of which are hereby incorporated in their entirety.

BACKGROUND OF THE INVENTION

Field of the Invention

The present invention relates to managing access to a plurality of applications on a computing device.

Description of the Related Technology

A computing device, such as a mobile telephone or a personal computer, may be configured with an inactivity timer which automatically locks the computing device in response to detecting a period of user inactivity with respect to the computing device which exceeds a predefined time period (hereinafter termed a "timeout period"). In this context, the inactivity timer relates to user activity with respect to the device and is thus termed a "device level" inactivity timer.

In a similar manner, an application running on a computing device may be configured with an inactivity timer which automatically locks the application in response to detecting a period of user inactivity with respect to the application which exceeds an application inactivity timeout time. In this context, the inactivity relates to user activity with respect to the application and is thus termed an "application level" inactivity timer.

It will be appreciated that user inactivity with respect to a computing device and an application running on the computing device is not necessarily mutually exclusive. For example, user activity with respect to an application will "reset" both the associated application level inactivity timer and the device level inactivity timer. Conversely, user activity with respect to the device will "reset" the device level inactivity timer but will not necessarily reset the application level inactivity timer.

In the present context, "user activity" refers to any type of activity by a user with respect to the computing device or the application. For example, user activity may refer to user interaction with the computing device or application via a user interface. Such interactions may be made using a keyboard, a mouse, a touchscreen, a microphone (e.g. voice control), a camera (e.g. gesture control) or any other appropriate input technique.

SUMMARY

A first embodiment provides a method of managing a plurality of applications on a computing device, the method comprising: receiving, by a first application running on the computing device, a lock message comprising a timestamp and a digital signature associated with the timestamp, from a second application running on the computing device; verifying, by the first application, the digital signature to confirm the authenticity of the timestamp; and locking the first application when the authenticity of the timestamp is confirmed by the first application. According to this embodiment, a lock event in respect of an application in the plurality of applications can be propagated to other applications in the plurality of applications.

In some embodiments the digital signature is generated by the second application using a digital certificate associated with the second application. This ensures that first application can verify the authentication of the lock message received from the second application.

In some embodiments the first application generates the key in response to detecting a reboot of the computing device. By generating or regenerating the key in response to a reboot, the method mitigates the risk posed by a replay attack from a malicious application or the like.

In some embodiments locking the first application comprises locking a user interface of the first application.

In some embodiments the lock message is a broadcast message to the plurality of applications on the computing device, the plurality of applications including the first application.

A second embodiment provides a method of managing a plurality of applications on a computing device, the method comprising: generating, by a first application running on the computing device, a lock message in response to detecting a lock event, wherein the lock message comprises a timestamp and a digital signature associated with the timestamp; and sending the lock message form the first application to a second application running on the computing device.

In some embodiments detecting the lock event comprises detecting that a user inactivity timer associated with the first application has expired.

In some embodiments detecting the lock event comprises detecting a user input via a user interface of the first application, wherein the user input is configured to lock the first application.

In some embodiments the lock message is broadcast to the plurality of applications on the computing device, the plurality of applications including the second application.

A third embodiment provides computer-readable storage medium comprising computer-executable instructions which, when executed by a processor, cause a computing device to perform a method of managing a plurality of applications on the computing device, the method comprising: receiving, by a first application running on the computing device, a lock message comprising a timestamp and a digital signature associated with the timestamp, from a second application running on the computing device; verifying, by the first application, the digital signature to confirm the authenticity of the timestamp; and locking the first application when the authenticity of the timestamp is confirmed by the first application.

A fourth embodiment provides a non-transitory computer-readable storage medium comprising computer-executable instructions which, when executed by a processor, cause a computing device to perform a method of managing a plurality of applications on the computing device, the method comprising: generating, by a first application running on the computing device, a lock message in response to detecting a lock event, wherein the lock message comprises a timestamp and a digital signature associated with the timestamp; and sending the lock message form the first application to a second application running on the computing device.

Further features and advantages of the invention will become apparent from the following description of embodi-

DETAILED DESCRIPTION OF CERTAIN INVENTIVE EMBODIMENTS

A computing device may be capable of executing a group of applications which are associated with one other by virtue of a common characteristic, such as a common application developer or a degree of common interoperability. In a typical example, a group of applications may be configured with a common access control mechanism, such as a single sign-on (SSO) mechanism or similar. In such situations, it is desirable to provide a mechanism for monitoring user activity across the group of applications, such that an inactivity timer for a particular application in the group can account for activity with respect to the other applications in the group.

Figure 1:
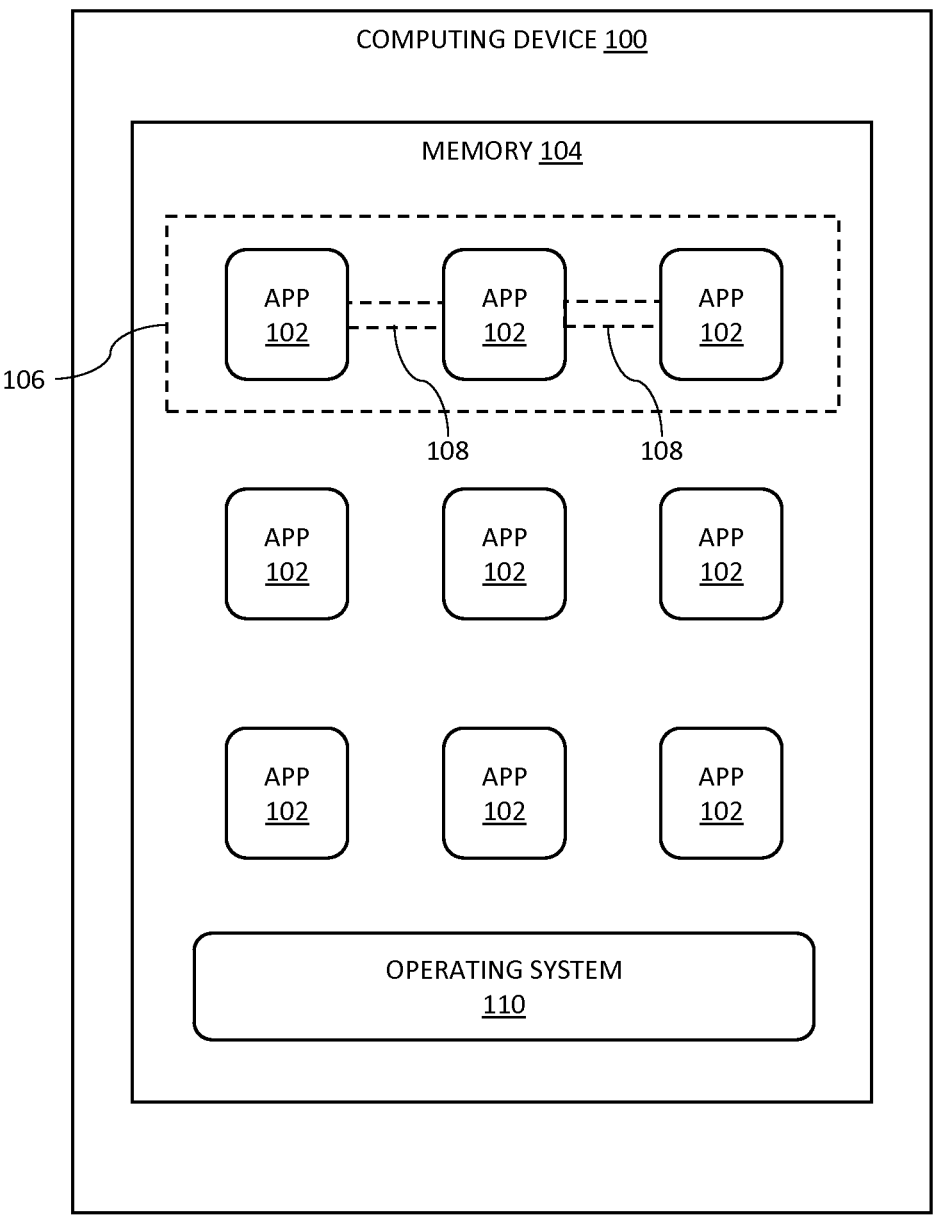
FIG. 1 is a schematic diagram showing a computing device configured with a plurality of applications according to one or more embodiments of the present invention.

FIG. 1 shows an example of a computing device 100 configured with a group of applications or "apps" which implement a method for monitoring user activity according to an embodiment. The computing device 100 may be a mobile computing device, such as a smartphone, a tablet computer or a wearable computing device such as Google Glass™ manufactured by Google™ Inc. of Mountain View, Calif., United States of America. The computing device 100 comprises a plurality of applications 102 which run in a volatile memory 104. The plurality of applications 102 includes a subset of applications 106 (termed "group applications") which are configured to provide a single sign-on (SSO) access control mechanism, such that access to the group applications 106 is restricted to a particular user of the computing device 100.

In order to prevent unauthorized access to data held by the group applications, each group application 106 is configured to securely store application data using cryptographic techniques as known in the art. For example, the group applications 106 may store application data in an encrypted container in non-volatile memory using cryptographic techniques known in the art. In a similar manner, the group applications 106 may be configured to utilize a secure inter-application communication protocol 108 to securely exchange messages with one another. For example, the group applications 106 may employ the Inter-Container Communication (ICC) protocol developed by Good Technology Corporation™ of Sunnyvale, Calif., United States of America, aspects of which are disclosed in US patent application publications US 2013-0227279, US 2013-0227287 and US 2013-0227280 which are hereby incorporated by reference.

In order to mitigate the risk posed by unauthorized use of the computing device 100 and the group applications 106, each group application 106 is configured with an inactivity timer which automatically locks a user interface associated with the respective group application 106 when a period of user inactivity with respect to the plurality of group applications 106 as a group exceeds a predefined time period (e.g. one minute). In other words, the inactivity timer for each group application 106 operates on the basis of user activity with respect to the plurality of group applications 106 as a whole, and is thus termed a "group level" inactivity timer. To provide group level monitoring of user activity with respect to the group applications 106, each group application 106 stores a timestamp which is indicative of the last detected user activity with respect to the plurality of group applications 106 as a whole. Each of the group applications 106 may transmit messages which include a timestamp indicative of the last detected user activity with respect to the transmitting group application 106 to other applications in the plurality of group applications 106. On receipt of a timestamp, each group application 106 compares the time indicated by the received timestamp with the time indicated by the stored timestamp and, if the received timestamp indicates a later time, updates the stored timestamp to reflect the later time. In this manner, the inactivity time for each of the plurality of group application 106 can account for the latest detected user activity with respect to the plurality of group applications 106 as a whole.

Computing device 100 includes an operating system 110 which runs in volatile memory 102 and manages hardware resources of the computing device 100. The operating system 110 provides common services to the plurality of applications 102, such as networking services and file system services, via one or more application programming interfaces (APIs). The operating system 110 may, for example, be a mobile operating system such as the iOS™ operating system developed by Apple™ Inc. of Cupertino, Calif., United States of America, or the Android™ operating system developed by Google™ Inc. of Mountain View, Calif., United States of America. In the example shown in FIG. 1, the operating system 110 provides a timestamp API based, for example, on a system clock provided by the computing device 100. The timestamp API is used by the group applications 106 to request timestamps for use in monitoring user activity across the plurality of group applications 106. For example, the timestamp API may provide functionality for requesting a timestamp indicating the time elapsed since a particular epoch, such as the time at which the computing device 100 was last rebooted. The timestamp API may also provide timestamps according to a range of resolutions, such a seconds or milliseconds, as required by the requesting group application 106.

Figure 2:
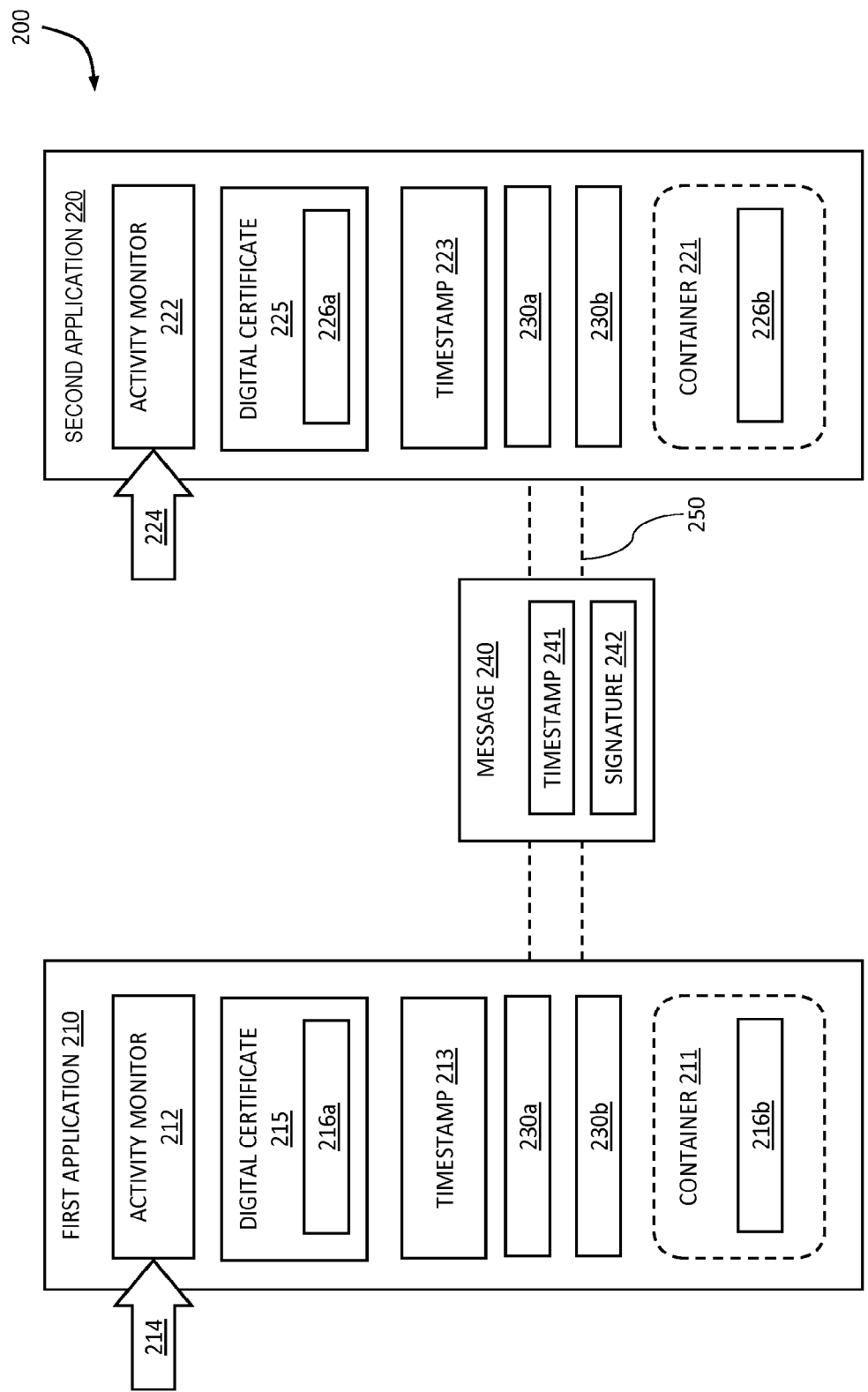
FIG. 2 is a schematic diagram showing a first application and a second application according to one or more embodiments of the present invention.

FIG. 2 shows a plurality of group applications 200 which implement a group level inactivity timer according to an embodiment. The plurality of group applications 200 includes a first group application 210 and a second group application 220. The group applications 200 are each configured with a cryptographically secure container 211, 221 in which application data is stored in encrypted form (e.g. in non-volatile memory). The secure containers 211, 221 may, for example, employ a symmetric key algorithm, an asymmetric key algorithm, or any other suitable cryptographic algorithm. In a typical example, the secure containers 211, 221 are secured using a symmetric key derived from a password or passcode used by the user to unlock the group applications 200 and confirming to the Advanced Encryption Standard (AES) established by the U.S. National Institute of Standards and Technology.

The first and second group applications 210, 220 are configured with respective activity monitors 212, 222 which monitor user activity with respect to the group applications 210, 220 and, based on this monitoring, update a timestamp 213, 223 which indicates the latest time that user activity was detected with respect to a respective group application 210, 220. The timestamps 213, 223 are typically stored in volatile memory associated with the respective group application 210, 220. Typically, the activity monitors 212, 222 monitor user activity based on activity data 214, 224 indicative of user interaction with a user interface for the respective group application 210, 220. For example, the activity monitors 212, 222 may monitor activity data 214, 224 received from an operating system (not shown) and indicative of user interactions with the associated group application 210, 220 via a user interface (not shown).

In addition to monitoring user activity, each activity monitor 212, 222 implements an inactivity timer for its respective group application 210, 220 based on the respective timestamp 213, 223 and a predefined timeout period (not shown) for each group application 210, 220. The activity monitors 212, 222 are configured to access their respective timestamps 213, 223 and to compare the time indicated by the timestamp with the current system time (e.g. retrieved from the operating system) to determine whether the elapsed time is greater than the timeout out period. If the elapsed time is greater than the timeout period, the inactivity timer status changes to "expired" and the activity monitor 212, 222 locks the application to prevent further access by the user (e.g. by disabling or locking the user interface of the respective group application 210, 220).

Communications between the first and second group applications 210, 220 are facilitated by an inter-application communication protocol 250 which provides encryption of data exchanged between the group applications 210, 220 based on digital certificates 215, 225 associated with the respective group applications 210, 220. Typically, the digital certificates 215, 225 are public key certificates which store a public key 216a, 226a for the particular group application 210, 220 and are digitally signed by a certificate authority according to a public-key infrastructure (PKI) scheme. A private key 216b, 226b corresponding to the public key 216a, 216a is stored securely in the respective secure container 211, 221 of the group applications 210, 220 such that it cannot be read by a malicious application or the like. The public keys 216a, 226a and private keys 216b, 226b are utilized by the group applications 210, 220 to encrypt and decrypt data transmitted using the inter-application communication protocol, using techniques known in the art. In a similar manner, each of the group applications 210, 220 also stores an asymmetric key pair 230 for creating and verifying digitally signed timestamps (hereinafter termed "timestamp key pair") using methods known in the art. Specifically, timestamp key pair 230 comprises a timestamp write key 230a which is used to digitally sign timestamps, and a timestamp read key 230b which is used to verify the authenticity of a digitally signed timestamp. Generation and distribution of the timestamp key pair 230 is described in more detail below with reference to FIG. 4.

In order to implement a group level inactivity timer for the plurality of group applications 200, the activity monitors 212, 222 are configured to generate and transmit messages which include timestamps indicating the time that user activity was last detected with respect to the transmitting group application (using the inter-application communication protocol). For example, the activity monitor 222 of the second group application 220 may generate and transmit a secure message 240 comprising a timestamp 241 and a timestamp signature 242 generated using the timestamp write key 230a. The secure message 240 may be generated and sent periodically (e.g. in the form of a "ping" message) or in response to a particular event (e.g. detection of user activity by the activity monitor). Alternatively or additionally, the timestamp 241 may be embedded as ancillary data in other messages transmitted from the second group applications 220 to the first group application 210 on an ad-hoc basis.

As discussed above, timestamp signature 242 is generated by activity monitor 222 by digitally signing timestamp 241 using the timestamp write key 230a. Upon receipt of message 240 at the first group application 210, the activity monitor 212 of the first group application 210 verifies the timestamp 241 using the timestamp signature 242 and the timestamp read key 230b. If verified, activity monitor 212 proceeds to compare timestamp 241 received from the first group application 220 with timestamp 213 and, if timestamp 241 indicates a time which is later than the time indicated by timestamp 213, the activity monitor updates timestamp 213 to reflect the later time indicated by timestamp 241. In this manner, the inactivity timer implemented by the first group application 210 can account for recent user activity with respect to the second group application 220.

In relation to the above description of FIG. 2, it will be appreciated that application of a digital signature to timestamp 241 using the timestamp write key 230b ensures that only timestamps from legitimate (i.e. authenticated) group applications are processed by the receiving group application 210. This prevents a malicious application from sending a faked timestamp to, for example, unlock a locked application or prevent an unlocked application from locking upon expiry of an inactivity timeout. In a similar manner, in some embodiments, timestamps 213, 223, 241 are generated relative to a last reboot time of the computing device 100. This mitigates the risk posed by a replay attack, whereby a malicious application may intercept and cache a signed timestamp and "rewind" the system clock such that the cached message may be "replayed" to unlock the receiving application. The risk posed by a replay attack of this nature can be further reduced by rotating or regenerating the timestamp key pair 230 each time the computing device 100 is restarted or each time the group application responsible for generating the timestamp key pair 230 is restarted, thereby rendering invalid any timestamps that were signed prior to device reboot. Further details of these countermeasures are provided below with reference to FIG. 4.

Figure 3:
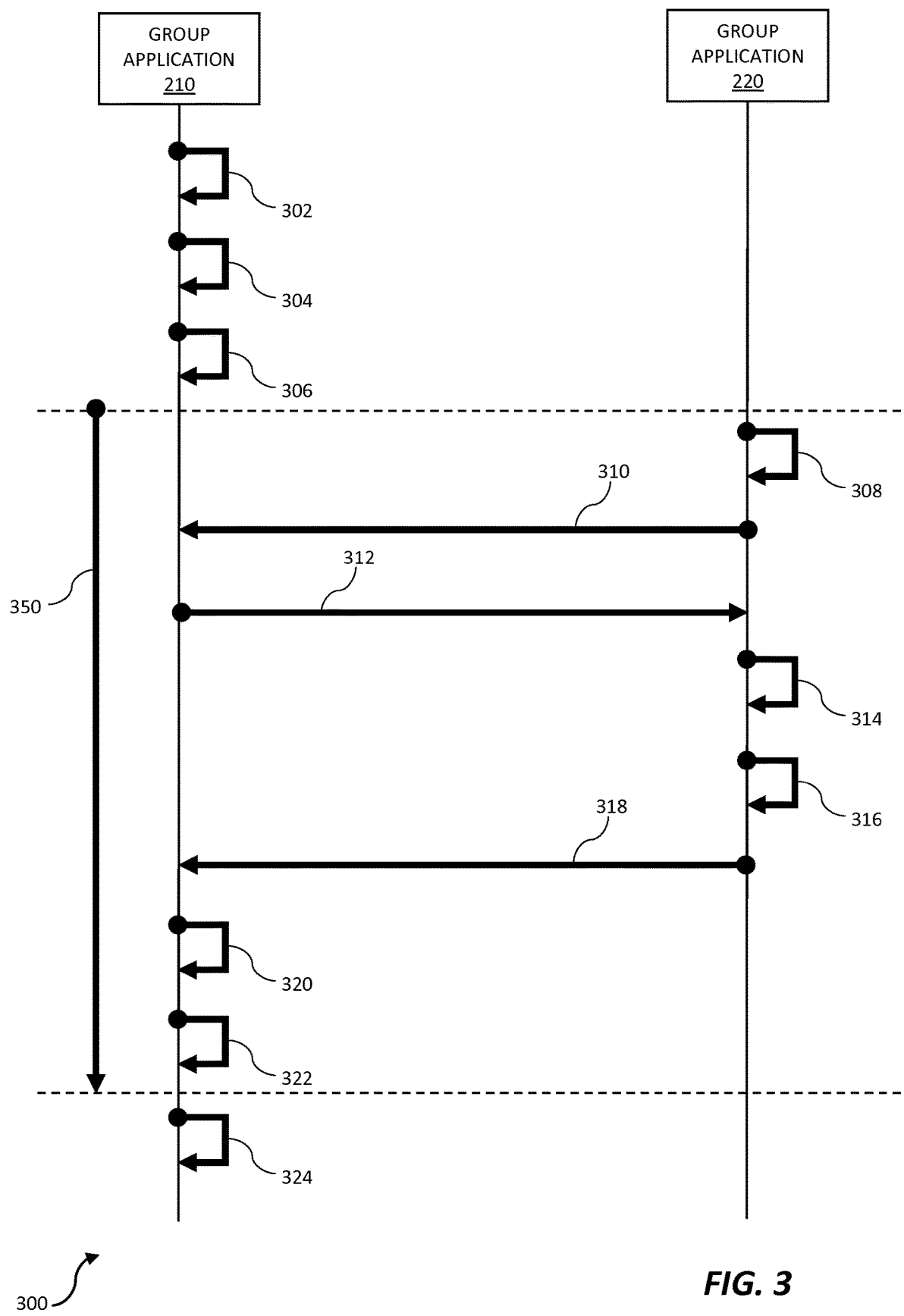
FIG. 3 is a signaling diagram showing a method of monitoring user activity with respect to a first application and a second application according to one or more embodiments of the present invention.

FIG. 3 shows a method 300 of monitoring user activity implemented by the plurality of the group applications 200 shown in FIG. 2 according to an embodiment. In this example, the group applications 200 implement a single sign-on (SSO) method whereby the first group application 210 acts as an "authentication delegate" for the second group application 220 which is termed an "authentication delegator". An example of authentication delegation in this manner is implemented in the Good Dynamics™ Secure Mobility Platform developed by Good Technology Corporation™ of Sunnyvale, Calif., United States of America, aspects of which are disclosed in US patent application publications US 2013-0227279, US 2013-0227287 and US 2013-0227280 mentioned above and incorporated by reference.

In a first step of method 300, the user loads and unlocks the first group application 210 by inputting their password via its user interface [step 302]. Once unlocked, the first group application 210 generates and stores timestamp key pair 230 [step 304]. Typically, the first application generates the timestamp key pair 230 using a key algorithm, such as an algorithm based on the public-key cryptography standards (PKCS) published by RSA™ Security LLC of Bedford, Mass., United States. Next, the activity monitor 212 of the first group application 210 monitors user activity with respect to the first group application 210 and updates timestamp 213 to indicate the last time user activity was detected [step 306]. At a later time, while the first group application 210 remains unlocked, the user loads the second group application 220 and proceeds to interact with the second group application 220 via its user interface [step 308]. As discussed above, in the present example the second group application 220 delegates authentication of the user to the first group application 210 and therefore sends an authentication request to the first application using secure inter-application protocol 250 [step 310]. Upon receipt of the authentication request, the first group application 210 confirms that the user is authenticated (for example, by virtue of the first group application being unlocked) and returns an unlock message comprising timestamp key pair 230 to the second group application 220 [step 312]. Upon receipt of the unlock message, the second group application 220 unlocks its user interface, decrypts its secure container 221, and stores timestamp key pair 230 in memory [step 314]. Next, the activity monitor 222 of the second group application 220 proceeds to monitor user activity with respect to the second group application 220 and updates timestamp 223 accordingly [step 316]. Periodically the activity monitor 222 of the second group application 220 generates signed timestamp 241 based on timestamp 223 and timestamp write key 230a, and embeds the signed timestamp 241 into a secure message 240 which is transmitted to the first group application 210 [step 318]. On receipt of secure message 240, the first group application 210 extracts timestamp 241 and verifies timestamp signature 242 using the timestamp read key 230b [step 320]. If the first group application 210 successfully verifies the authenticity of the timestamp 241 received from the second group application 220, it proceeds to compare the received timestamp 241 to the timestamp 213 stored in the secure container 211 and, if timestamp 241 indicates a later time that the time indicated by timestamp 213, the first group application 210 updates timestamp 213 to indicate the later time [step 322]. In this manner, the inactivity timer provided by the activity monitor 212 of the first group application 210 will not expire even if the activity monitor 212 does not detect user activity with respect to the first group application for a time period exceeding the timeout period 350 of the first group application, by virtue of the user's activity with respect to the second group application 220. Thus, when the user returns to the first group application 210 after a period of inactivity with respect to the first group application 210 which exceeds its timeout period 350 [step 324], the first group application 210 remains unlocked and the user is not required to re-enter their password to continue using the first group application 210.

Figure 4:
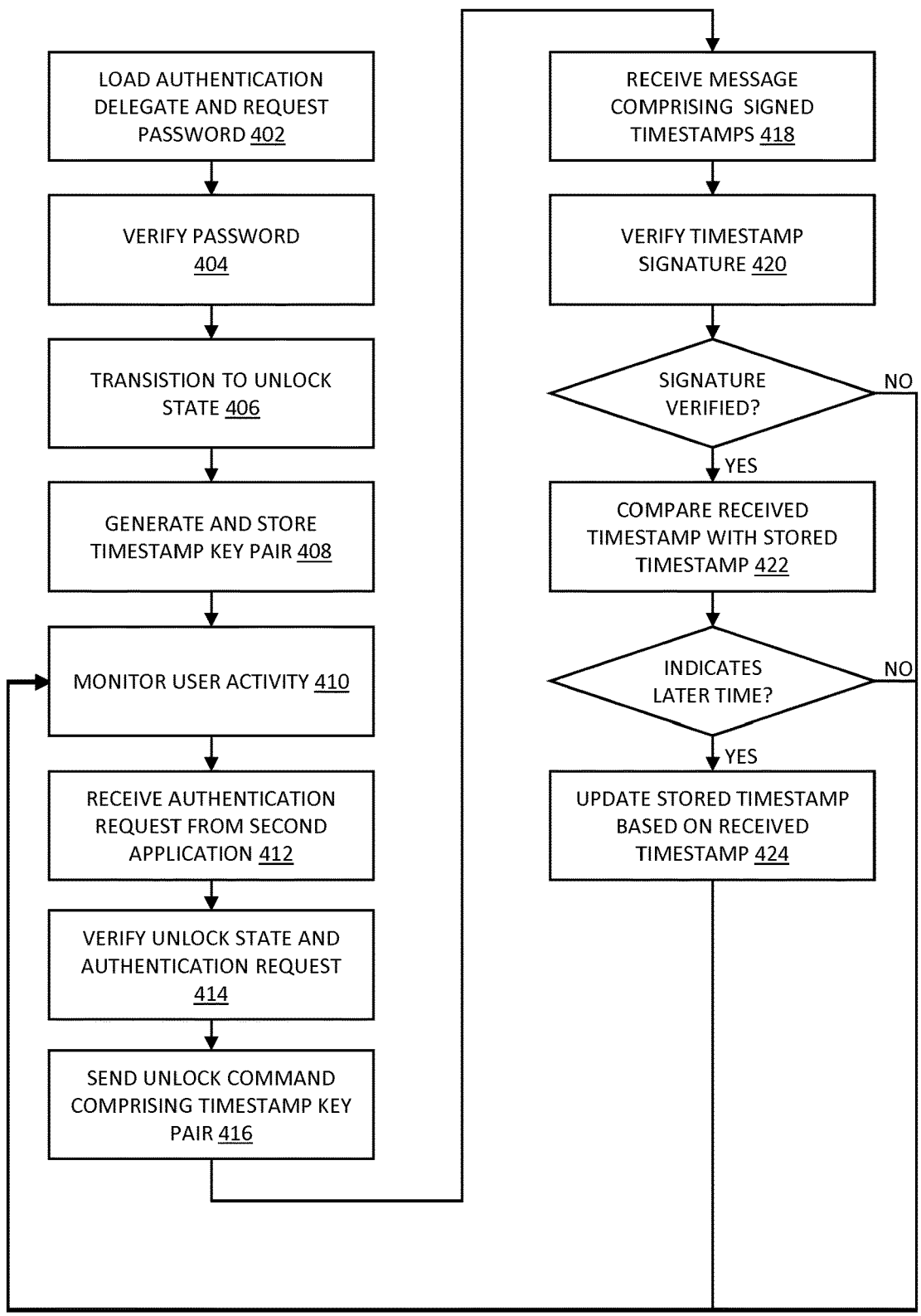
FIG. 4 is a flow diagram showing a method of monitoring user activity from the perspective of a first application according to one or more embodiments of the present invention.

FIG. 4 shows an example of a method 400 for monitoring user activity across the plurality of group applications 200 from the perspective of the first group application 210, according to an embodiment. In this example, the first group application 210 acts as "authentication delegate" to the plurality of group applications 200 to provide single sign-on access control as discussed above in relation to FIG. 3. First, the computing device 100 loads the authentication delegate 210 into memory and the user interface presents an unlock screen requesting the user's password in order to unlock the authentication delegate 210 [step 402]. Upon receipt of the user's password, the authentication delegate 210 verifies the password [step 404] and, if the password is verified, unlocks its user interface and transitions to an unlock state [step 406]. Next, the authentication delegate 210 generates and stores timestamp key pair 230 [step 408]. Next, activity monitor 212 monitors user activity with respect to the authentication delegate 210 (i.e. first group application 210) and updates timestamp 213 to indicate the last time user activity was detected [step 410]. At a later time the authentication delegate 210 receives an authentication request from a further application 220 which has delegated authentication of the user to the authentication delegate [step 412]. Responsive to the authentication request, the authentication delegate 210 confirms that it is in an unlocked state (i.e. the inactivity timer has not expired) and may also confirm the authenticity of the unlock request using, for example, the public certificate 225 of the requesting application 220 [step 414]. Next, the authentication delegate 210 sends an unlock command including the timestamp key pair 230 to the requesting application 220 [step 416]. Once the requesting application 220 has been unlocked, it proceeds to periodically transmit secure messages 240 comprising timestamp 241 signed by the timestamp write key 230a and indicative of the time that user activity was last detected by application 220. Upon receipt of secure message 240 [step 418], authentication delegate 210 verifies the timestamp 241 based on timestamp signature 242 and the timestamp read key 230b [step 420]. If the authentication delegate 210 is able to verify the authenticity of timestamp 241, it proceeds to compare timestamp 241 to timestamp 213 stored in its secure container [step 422] and, if the received timestamp indicates a later time that the time the authentication delegate 210 updates timestamp 213 to indicate the later time [step 424].

Figure 5:
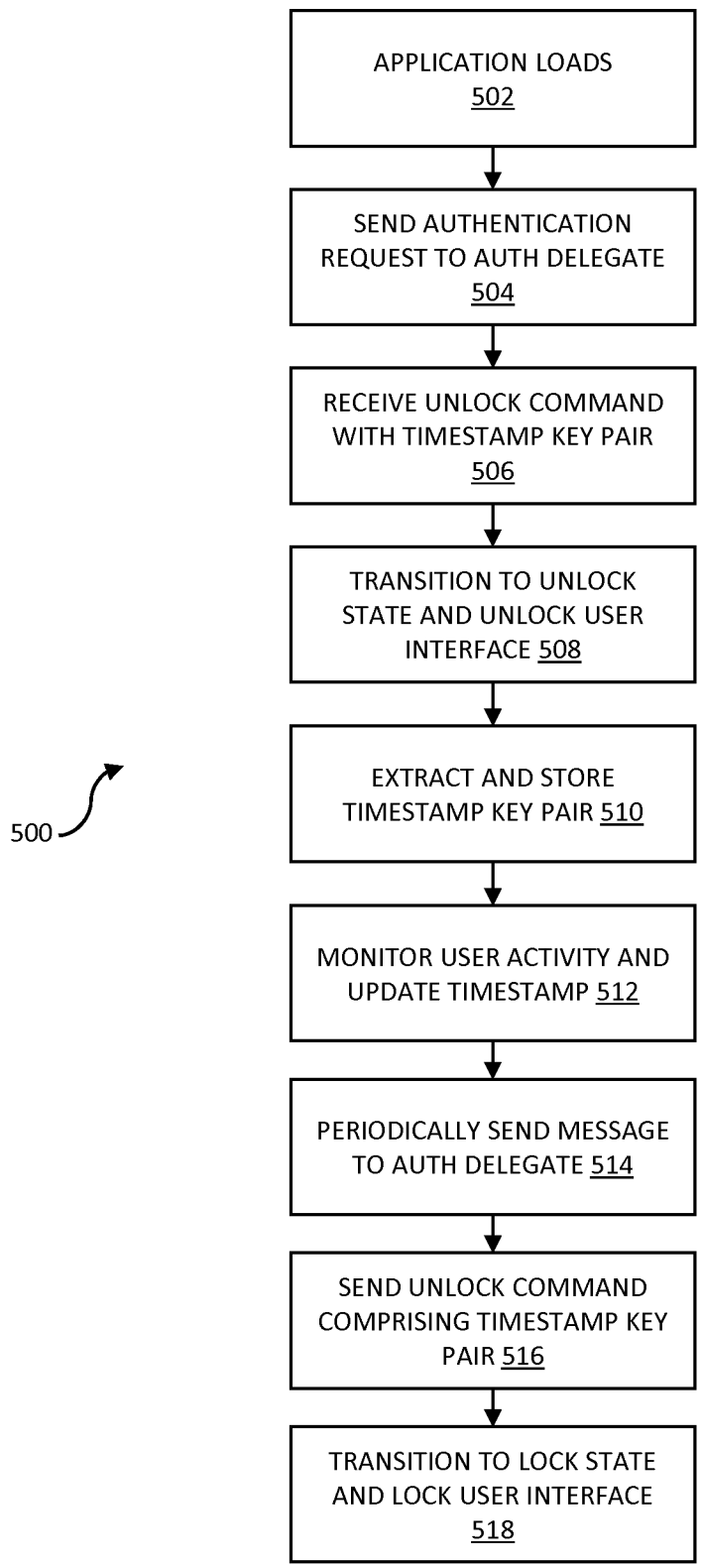
FIG. 5 is a flow diagram showing a method of monitoring user activity from the perspective of a second application according to one or more embodiments of the present invention.

FIG. 5 shows an example of a method 500 for monitoring user activity across the plurality group of applications 200 from the perspective of the second group application 220, according to an embodiment. In this example, the second group application 220 delegates authentication of the user to the first group application (i.e. the authentication delegate 210 of FIG. 4) to provide single sign-on access control as discussed above. First, the user loads application 220 [step 502] which in turn sends an authentication request to the authentication delegate 210 [step 504]. If application 220 is authenticated by the authentication delegate 210, it receives an unlock command from the authentication delegate 220 comprising timestamp key pair 230 [step 506]. In response to receiving the unlock command, application 220 transitions to an unlock state, unlocks its user interface [step 508] and extracts the timestamp key pair from the unlock command and saves the key pair in its secure container 221 [step 510]. Once application 220 has been unlocked, it proceeds to monitor user activity with respect to the application 220 and update timestamp 223 stored in secure container 221 [step 512]. Whilst the application 220 remains in an unlocked state, it periodically generates and sends a secure message 240 comprising timestamp 241 and timestamp signature 242, based on the timestamp 223 and timestamp write key 230a [step 514]. Finally, if application 220 detects a period of inactivity exceeding its timeout period [step 516], it transitions to a lock state and locks its user interface [step 518].

As discussed above, signed timestamp 241 may be embedded as ancillary data in messages transmitted between group applications 200. For example, signed timestamp 241 may be included in a connection request message or a connection response message exchanged between the group applications 200 according to the secure inter-application communication protocol 250.

Figure 6A:
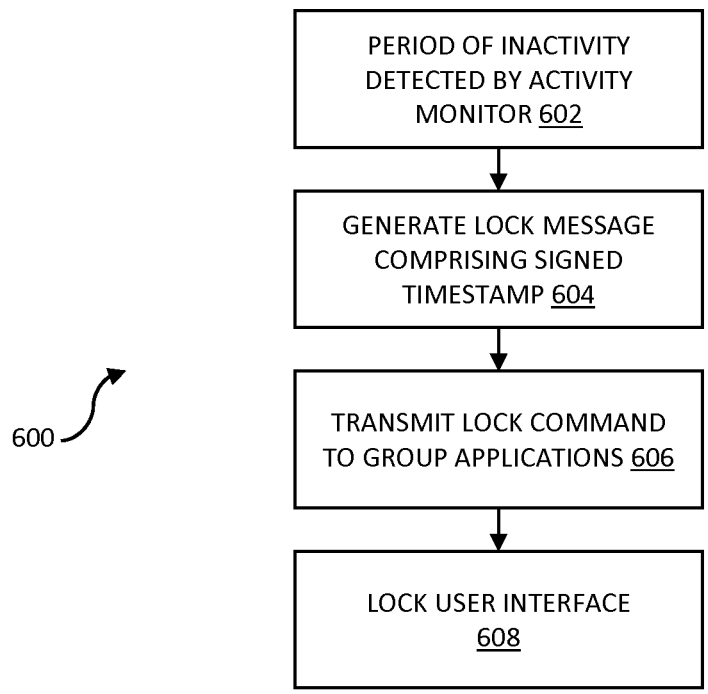
FIGS. 6A and 6B are flow diagrams showing a method for locking a first application and a second application according to one or more embodiments of the present invention.

Further embodiments provide a mechanism for locking the plurality of group applications 200 by means of a secure lock command or message which is transmitted between the group applications 210, 220. FIG. 6A shows an example of a method 600 for generating a secure lock command upon receipt of a lock request at the second group application 220 according to an embodiment. In a first step, the second group application 220 receives a lock command received via a user interface (e.g. a "lock application now" command) [step 602]. Responsive to receipt of the lock command, the second group application 220 generates or requests a timestamp for the current time from the operating system 110, signs the timestamp using its respective private key 226b associated with certificate 225 and inserts the signed timestamp into a lock message for transmission to the first group application 210 [step 604]. The second group application 220 transmits the lock command to the first group application 210 using the inter-application protocol 250 [step 606] and locks its user interface to prevent further user interaction [step 608].

Figure 6B:
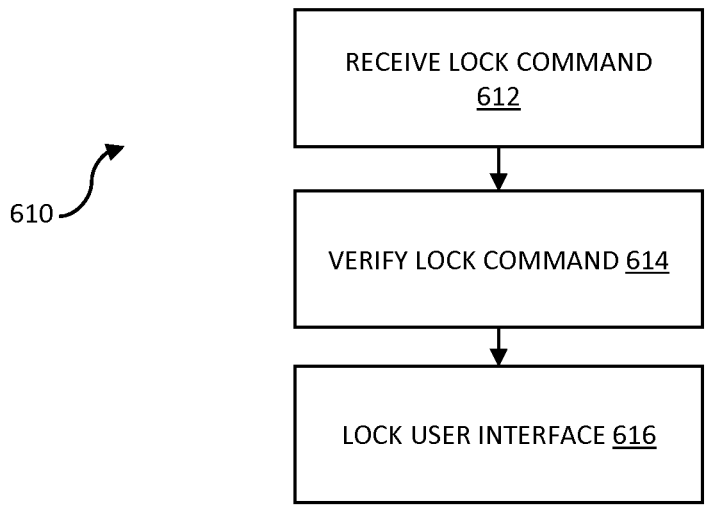

FIG. 6B shows an example of a method 610 for processing the lock command generated according to method 600 at the first group application 210 according to an embodiment. Upon receipt of the lock command, the first group application 210 verifies the authenticity of the signed timestamp using the public key 226a of the second group application 220 and checks that the time indicated by the timestamp is within a current time window (e.g. the preceding second) [step 610]. If the lock command is verified as authentic, the first group application 210 locks to prevent further user interaction via its user interface [step 610].

The time window is selected to accommodate possible delays associated with operating system message queuing and also to mitigate against replay attacks. For example, the time window should be sufficiently long to avoid valid lock commands being ignored due to message delay, and should be should be sufficiently short to mitigate against a replay attack whereby the same lock command is replayed multiple times within the time window.

With regard to the lock command discussed above in relation to FIGS. 6A and 6B, it will be appreciated that the group applications 200 may be configured to issue a secure lock command in response to various events. For example, a lock command may be issued upon expiry of the inactivity timer of one of the group applications 200. Issuing a lock command upon expiry of the inactivity timer of one of the group applications 200 in this manner may be desirable in scenarios where only a subset of the plurality of group applications 200 implement respective inactivity timers. Alternatively or additionally, an application may generate and issue the secure lock command in response to a lock command received from a control server remote from the computing device 100, or any other suitable event detected by the group applications 200.

It will be appreciated that the messages passed between group applications 200 in the above embodiments may be implemented as unicast messages (i.e. one-to-one), multicast messages (i.e. one-to-many), or broadcast (i.e. one-to-all). For example, where the operating system 110 provides multicast and/or broadcast message capabilities, message 240 in relation to FIG. 2 and/or the lock messages described in relation to FIGS. 6A and 6B can be sent to all group applications 200. Conversely, where the operating system 110 provides only unicast message capabilities, group applications 200 may be configured to send message 240 and lock messages to a designated group application, such as an authentication delegate. In further embodiments, message 240 may sent to a subset or subgroup of the group applications 200, thereby providing "subgroup" level inactivity timer, and allowing the inactivity for group applications 200 operating outside the subgroup to implement independent inactivity timers.

The embodiments described above in relation to FIGS. 6A and 6B are particularly applicable to embodiments where the group applications 200 implement a single sign-on access control mechanism. In such embodiments, the secure lock command ensures that an application which delegates authentication to an authentication delegate can inform the authentication delegate of the lock event prior to locking its user interface. Under some circumstances, a locked group application 200 may automatically send an unlock command to its authentication delegate in response to a lock event and, in such a situation, the authentication may automatically respond with an unlock command if the authentication delegate is itself unlocked. Thus, notification of a lock event to the authentication delegate in the manner described in relation to FIGS. 6A and 6B ensures that the authentication delegate does not automatically attempt to unlock the application, thereby rendering the lock event ineffective.

Figure 7:
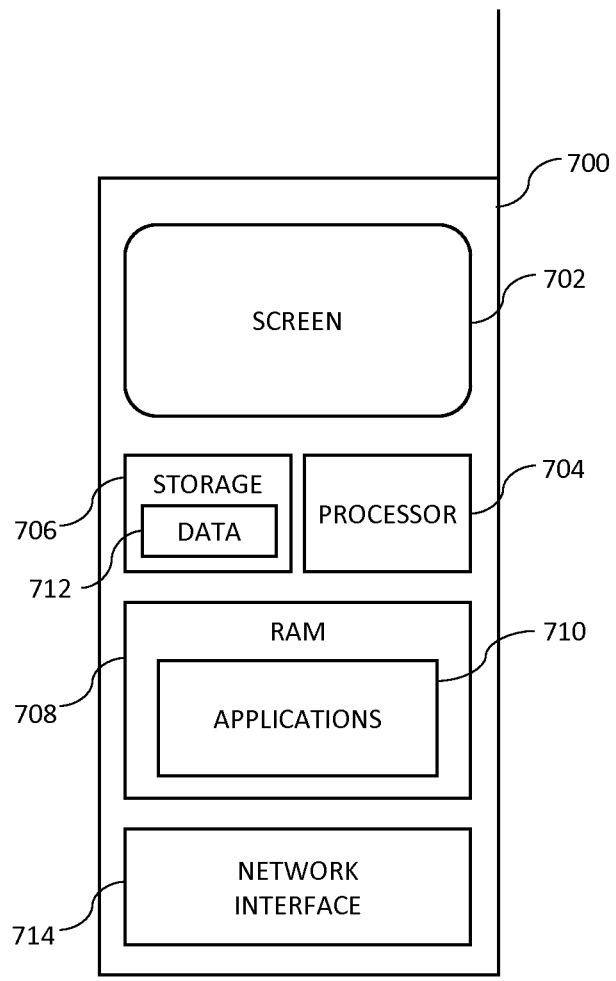
FIG. 7 is a schematic diagram showing a computing device suitable for implementing a method of monitoring user activity according to one or more embodiments of the present invention.

An example of a portable computing device 700 comprising a plurality of applications configured according to embodiment is shown schematically in FIG. 7. The portable computing device 700 may, for example, take the form of a smart phone, a personal digital assistance (PDA), a tablet computer or a notebook computer, etc. The portable computing device 700 includes a screen 702, which may be a touch screen for receipt of input from a user. Alternatively or additionally, the portable computing device 700 may include a physical keyboard (not shown), which may be integral to the portable computing device 700 or connected wirelessly or by wired connection to the portable computing device 700. The computing device further includes a processor 704, a non-volatile storage device 706 (such as a hard disk drive or a solid-state drive) and a random access memory (RAM) 708. The processor executes instructions stored in the random access memory 708 that have been loaded from the non-volatile storage device 706. The instructions are in the form of one or more programs that implement an operating system (not shown) and a plurality of group applications 710 according to the preceding embodiments. The random access memory 708 is also used by programs running on the processor 704 as a means of storing and accessing data in the form of electronic signals where the data is used during the execution of the programs. The operating system provides a file system for storing, modifying and accessing files held in the non-volatile storage device 706. The file system may be accessible to other programs running on the processor 704 via the operating system. The applications 710 on the processor 704 also process user input obtained via the screen 702 or keyboard (not shown) and implement a group level inactivity timer and/or lock protocol according to the embodiments described above with reference to FIGS. 1 to 6. The portable computing device 700 also includes a network interface 714 (or a plurality of network interfaces) which allows programs running on the processor 704 to transmit and receive data to and from other devices and/or servers via a communications, using wired and/or wireless connections. Typically, the network interface 714 is implemented in a combination of software and hardware (e.g. a network interface controller) to provide the necessary network connectivity to the programs running on the processor 704. Examples of network interface 714 include a Wi-Fi™ interface and/or a cellular radio utilizing standards such as GSM, UMTS and/or LTE.

It will be appreciated that at least parts of the methods discussed above with reference to FIGS. 2 to 6B may be implemented using software instructions stored on a computer useable storage medium for execution by a computing device. As an example, an embodiment of a computer program product includes a computer useable storage medium to store a computer readable program that, when executed on a computing device, causes the computing device to perform operations, as described hereinbefore. Furthermore, embodiments of the invention can be embodied in the form of a computer program product accessible from a computer-usable or computer-readable medium providing program code for use by or in connection with a computing device or any instruction execution system. For the purposes of this description, a computer-usable or computer-readable medium can be any apparatus that can contain, store, communicate, propagate, or transport the program for use by or in connection with the instruction execution system, apparatus, or device. The apparatus may be a transitory or a non-transitory computer-readable medium. For example, the computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. Similarly, it will be understood that the various methods shown in the Figures are illustrative in nature and the order in which the steps occur in the illustrated methods may be varied, various steps may be combined, or various steps may occur concurrently, without departing from the scope of the invention as defined in the accompanying claims.

What is claimed is:

1. A method of managing a plurality of applications on a computing device, the method comprising:
    receiving, by a first application running on the computing device, a lock message comprising a timestamp and a digital signature of the timestamp, from a second application running on the computing device, wherein the lock message is generated by the second application in response to the second application detecting a lock event, the timestamp indicates a time that the second application detects the lock event and the digital signature of the timestamp is generated by the second application based on the timestamp and a private key of the second application, the private key of the second application is associated with a digital certificate associated with the second application, the digital certificate stores a public key of the second application, and the second application generates the private key in response to detecting a reboot of the computing device;
    verifying, by the first application, the digital signature to confirm an authenticity of the timestamp; and
    locking the first application when the authenticity of the timestamp is confirmed by the first application.

2. The method of claim 1, wherein locking the first application comprises locking a user interface of the first application.

3. The method of claim 1, wherein the lock message is a broadcast message to the plurality of applications on the computing device, the plurality of applications including the first application.

4. A method of managing a plurality of applications on a computing device, the method comprising:
    generating, by a first application running on the computing device, a digital signature of a timestamp based on the timestamp and a private key of the first application, wherein the private key of the first application is associated with a digital certificate associated with the first application, the digital certificate stores a public key of the first application, and the first application generates the private key in response to detecting a reboot of the computing device;
    generating, by the first application, a lock message in response to detecting a lock event, wherein the lock message comprises the timestamp, the timestamp indicates a time that the first application detects the lock event, and the digital signature of the timestamp; and
    sending the lock message from the first application to a second application running on the computing device.

5. The method of claim 4, wherein detecting the lock event comprises detecting that a user inactivity timer associated with the first application has expired.

6. The method of claim 4, wherein detecting the lock event comprises detecting a user input via a user interface of the first application, wherein the user input is configured to lock the first application.

7. The method of claim 4, wherein the lock message is broadcast to the plurality of applications on the computing device, the plurality of applications including the second application.

8. A non-transitory computer-readable storage medium comprising computer-executable instructions which, when executed by a processor, cause a computing device to perform operations of managing a plurality of applications on the computing device, the operations comprising:
    receiving, by a first application running on the computing device, a lock message comprising a timestamp and a digital signature of the timestamp, from a second application running on the computing device, wherein the lock message is generated by the second application in response to the second application detecting a lock event, the timestamp indicates a time that the second application detects the lock event and the digital signature of the timestamp is generated by the second application based on the timestamp and a private key of the second application, the private key of the second application is associated with a digital certificate associated with the second application, the digital certificate stores a public key of the second application, and wherein the application generates the private key in response to detecting a reboot of the computing device;

verifying, by the first application, the digital signature to confirm an authenticity of the timestamp; and locking the first application when the authenticity of the timestamp is confirmed by the first application.

9. The non-transitory computer-readable storage medium of claim 8, wherein locking the first application comprises locking a user interface of the first application.

10. The non-transitory computer-readable storage medium of claim 8, wherein the lock message is a broadcast message to the plurality of applications on the computing device, the plurality of applications including the first application.

11. A non-transitory computer-readable storage medium comprising computer-executable instructions which, when executed by a processor, cause a computing device to perform operations of managing a plurality of applications on the computing device, the operations comprising:

generating, by a first application running on the computing device, a digital signature of a timestamp based on the timestamp and a private key of the first application, wherein the private key of the first application is associated with a digital certificate associated with the first application, the digital certificate stores a public key of the first application, and the first application generates the private key in response to detecting a reboot of the computing device;

generating, by the first application, a lock message in response to detecting a lock event, wherein the lock message comprises the timestamp, the timestamp indicates a time that the first application detects the lock event, and the digital signature of the timestamp; and sending the lock message from the first application to a second application running on the computing device.

12. The non-transitory computer-readable storage medium of claim 11, wherein detecting the lock event comprises detecting that a user inactivity timer associated with the first application has expired.

13. The non-transitory computer-readable storage medium of claim 11, wherein detecting the lock event comprises detecting a user input via a user interface of the first application, wherein the user input is configured to lock the first application.

14. The non-transitory computer-readable storage medium of claim 11, wherein the lock message is broadcast to the plurality of applications on the computing device, the plurality of applications including the second application.

* * * * *